United States Patent
Yamada et al.

(10) Patent No.: US 11,400,905 B2
(45) Date of Patent: Aug. 2, 2022

(54) VEHICLE CONTROL DEVICE, VEHICLE CONTROL METHOD AND PROGRAM

(71) Applicant: MITSUBISHI HEAVY INDUSTRIES ENGINEERING, LTD., Yokohama (JP)

(72) Inventors: Masahiro Yamada, Tokyo (JP); Noritaka Yanai, Tokyo (JP); Yutaka Miyajima, Tokyo (JP)

(73) Assignee: MITSUBISHI HEAVY INDUSTRIES ENGINEERING, LTD., Yokohama (JP)

( * ) Notice: Subject to any disclaimer, the term of this patent is extended or adjusted under 35 U.S.C. 154(b) by 441 days.

(21) Appl. No.: 16/485,020

(22) PCT Filed: Feb. 22, 2018

(86) PCT No.: PCT/JP2018/006470
§ 371 (c)(1),
(2) Date: Aug. 9, 2019

(87) PCT Pub. No.: WO2018/155558
PCT Pub. Date: Aug. 30, 2018

(65) Prior Publication Data
US 2020/0039489 A1    Feb. 6, 2020

(30) Foreign Application Priority Data
Feb. 24, 2017 (JP) .............................. JP2017-033292

(51) Int. Cl.
*B60T 8/00* (2006.01)
*B60T 8/74* (2006.01)
(Continued)

(52) U.S. Cl.
CPC .............. *B60T 8/74* (2013.01); *B60T 8/1705* (2013.01); *B60T 8/1893* (2013.01); *B60T 8/3205* (2013.01); *B60T 17/228* (2013.01)

(58) Field of Classification Search
None
See application file for complete search history.

(56) References Cited

U.S. PATENT DOCUMENTS

2010/0241296 A1* 9/2010 Rhea, Jr. ................. B61L 27/04
701/20
2013/0151107 A1* 6/2013 Nikovski ........... G01C 21/3446
701/99

FOREIGN PATENT DOCUMENTS

JP    2004-266986 A    9/2004
JP    2010-136561 A    6/2010
(Continued)

OTHER PUBLICATIONS

PCT/ISA/210, "International Search Report for International Application No. PCT/JP2018/006470," dated May 22, 2018.
(Continued)

*Primary Examiner* — Truc M Do
(74) *Attorney, Agent, or Firm* — Manabu Kanesaka; Benjamin Hauptman; Kenneth Berner

(57) ABSTRACT

A powering pattern representing velocity of a vehicle at each position of a powering interval in a braking delay period between a timing at which the vehicle exceeds allowable velocity and a braking timing at which the vehicle starts to brake, and a coasting pattern representing velocity of the vehicle at each position of a coasting interval subsequent to the powering interval in the braking delay period are calculated after calculating a braking pattern representing velocity of the vehicle in a braking interval, which is a running interval subsequent to the coasting interval and which occurs between a position of the vehicle at the braking (Continued)

timing and a target position for controlling the vehicle to run at predetermined velocity or less, wherein an acceleration characteristic depending on velocity of the vehicle is used to calculate at least the powering pattern.

10 Claims, 5 Drawing Sheets

(51) Int. Cl.
  *B60T 8/17* (2006.01)
  *B60T 8/18* (2006.01)
  *B60T 8/32* (2006.01)
  *B60T 17/22* (2006.01)

(56) References Cited

FOREIGN PATENT DOCUMENTS

| | | |
|---|---|---|
| JP | 2011-217564 A | 10/2011 |
| JP | 5373861 B2 | 12/2013 |
| JP | 2014-004869 A | 1/2014 |
| JP | 5391742 B2 | 1/2014 |

OTHER PUBLICATIONS

PCT/ISA/237, "Written Opinion of the International Searching Authority for International Application No. PCT/JP2018/006470," dated May 22, 2018.

\* cited by examiner

VEHICLE CONTROL DEVICE, VEHICLE CONTROL METHOD AND PROGRAM

TECHNICAL FIELD

The present invention relates to a vehicle control device, a vehicle control method, and a program.

The present application claims the benefit of priority on Japanese Patent Application No. 2017-33292 filed on Feb. 24, 2017, the subject matter of which is incorporated herein by reference.

BACKGROUND ART

According to train signal system standards (IEEE1474), it is required to calculate allowable velocity at which vehicles should be necessarily stopped in a vehicle-running permitted interval of distance in consideration of stoppage delays in acceleration controls of motors, braking delays, and track gradients. The IEEE1474 stipulates the worst-case scenario as a phenomenon in which vehicles may undergo the maximum braking distances according to powering patterns, coasting patterns, and braking conditions due to stoppage delays in acceleration controls and braking-start delays. As the related art, Patent Document 1 can be mentioned.

CITATION LIST

Patent Document

Patent Document 1: Japanese Patent No. 53917342

SUMMARY OF INVENTION

Technical Problem

To control vehicles such as trains running along tracks, it is necessary to control vehicles to stop within vehicle-running permitted intervals of distance in the worst-case scenario of the IEEE1474.

The present invention aims to provide a vehicle control device, a vehicle control method, and a program, which can solve the above problem.

Solution to Problem

According to a first aspect of the invention, a vehicle control device includes an allowable velocity pattern calculation part configured to calculate a powering pattern representing the velocity of a vehicle at each position of a powering interval in a braking delay period between the timing at which the vehicle exceeds allowable velocity and the braking timing at which the vehicle starts to brake, and a coasting pattern representing the velocity of the vehicle at each position of a coasting interval subsequent to the powering interval in the braking delay period after calculating a braking pattern representing the velocity of the vehicle in a braking interval, which is a running interval subsequent to the coasting interval and which occurs between the position of the vehicle at the braking timing and the target position for controlling the vehicle to run at predetermined velocity or less. The allowable velocity pattern calculation part uses an acceleration characteristic depending on the velocity of the vehicle when calculating at least the powering pattern.

In the vehicle control device, the allowable velocity calculation part uses the acceleration characteristic depending on the velocity of the vehicle when calculating at least one of the coasting pattern and the braking pattern.

In the vehicle control device, when the start point of the powering pattern precedes to the current position of the vehicle, the allowable velocity pattern calculation part carries out iterative calculations to calculate the switching position between the coasting pattern and the braking pattern and the velocity of the vehicle at the switching position as well as the switching position between the powering pattern and the coasting pattern and the velocity of the vehicle at the switching position based on the prescribed coasting period of the coasting interval and the prescribed acceleration of the vehicle in the prescribed coasting period as well as the prescribed powering period of the powering interval and the prescribed acceleration of the vehicle depending on its velocity in the prescribed powering period.

In the vehicle control device, the allowable velocity pattern calculation part calculates the powering interval and the coasting interval based on the assumed velocity of the vehicle at the current position upon assuming that the braking pattern continues from the current position of the vehicle before the braking pattern., wherein the allowable velocity pattern calculation part calculates the switching position between the coasting pattern and the braking pattern and the velocity of the vehicle at the switching position as well as the switching position between the powering pattern and the coasting pattern and the velocity of the vehicle at the switching position, and the velocity at the current position based on the powering interval and the coasting interval.

In the vehicle control device, the allowable velocity pattern calculation part may calculate the allowable velocity based on an altitude at the current position and an altitude at the target position.

In the vehicle control device, the allowable velocity pattern calculation part may use the acceleration characteristic depending on the weight of the vehicle.

According to a second aspect of the invention, a vehicle control method includes: calculating by an allowable velocity pattern calculation part of a vehicle control device a powering pattern representing the velocity of a vehicle at each position of a powering interval in a braking delay period between the timing at which the vehicle exceeds allowable velocity and the braking timing at which the vehicle starts to brake, and a coasting pattern representing the velocity of the vehicle at each position of a coasting interval subsequent to the powering interval due to in the braking delay period after calculating a braking pattern representing the velocity of the vehicle in a braking interval, which is a running interval subsequent to the coasting interval and which occurs between the position of the vehicle at the braking timing and the target position for controlling the vehicle to run at predetermined velocity or less, wherein the allowable velocity pattern calculation part uses an acceleration characteristic depending on the velocity of the vehicle when calculating at least the powering pattern.

According to a third aspect of the invention, a program causes a computer of a vehicle control device to function as an allowable velocity pattern calculation means configured to calculate a powering pattern representing the velocity of a vehicle at each position of a powering interval in a braking delay period between the timing at which the vehicle exceeds allowable velocity and the braking timing at which the vehicle starts to brake, and a coasting pattern representing the velocity of the vehicle at each position of a coasting interval subsequent to the powering interval in the braking delay period after calculating a braking pattern representing the velocity of the vehicle in a braking interval, which is a running interval subsequent to the coasting interval and which occurs between the position of the vehicle at the braking timing and the target position for controlling the vehicle to run at predetermined velocity or less, wherein an acceleration characteristic depending on the velocity of the vehicle is used to calculate at least the powering pattern.

Advantageous Effects of Invention

According to the present invention, it is possible to provide a vehicle control device configured to accurately calculate the allowable velocity and configured to control a vehicle to stop within a vehicle-running permitted interval of distance in the worst-case scenario of the IEEE1474.

DESCRIPTION OF EMBODIMENTS

First Embodiment

Hereinafter, a vehicle control device according to the first embodiment of the present invention will be described with reference to the drawings.

Figure 1:
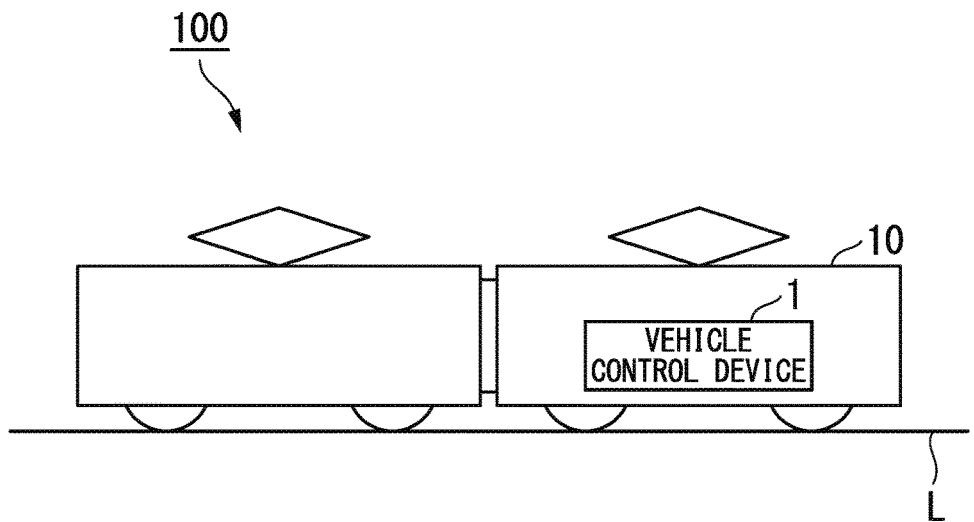
FIG. 1 is a schematic diagram showing a vehicle control system equipped with a vehicle control device according to the first embodiment.

FIG. 1 is a schematic diagram showing a vehicle control system equipped with a vehicle control device according to the first embodiment.

As shown in this drawing, a vehicle control system 100 includes a train 10 and a vehicle control device 1 installed in the train 10. The vehicle control device 1 carries out a train-velocity control to inhibit the train 10 from passing over the running-limit position (i.e. the boundary of an interval of distance allowing the train to run), which is instructed by an upper device. In addition, the vehicle control device 1 carries out a velocity control to decelerate the train 10 to be under a predetermined limit velocity at the target position according to an instruction from the upper device.

Figure 2:
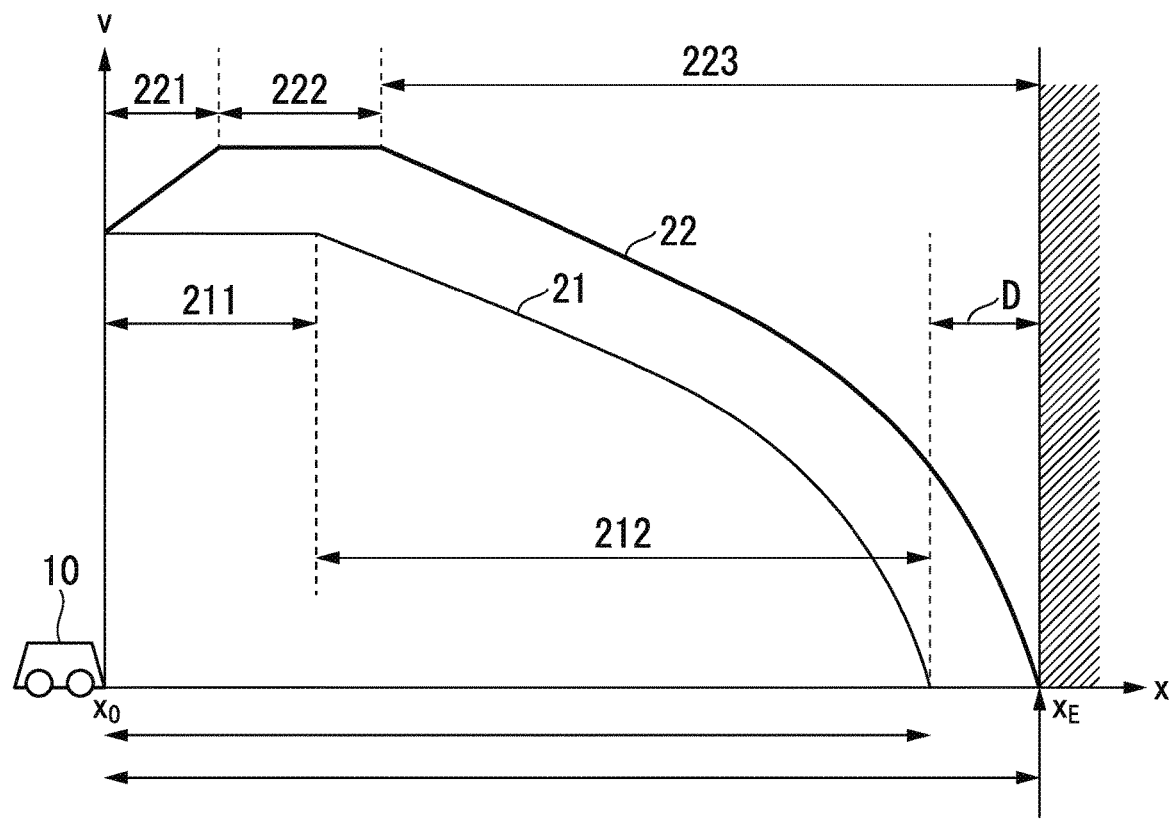
FIG. 2 is a graphic diagram showing velocity patterns according to the position of a train according to the first embodiment.

FIG. 2 is a graphic diagram showing velocity patterns depending on the position of the train 10.

FIG. 2 shows a velocity pattern 21 in which the train 10 is not subjected to a powering pattern, and a worst pattern 22 stipulated as the worst-case scenario of the IEEE1474. The velocity pattern 21 shows changes of velocities at various points in which the train 10 is not controlled to brake at the position $x_0$, and then the train 10 coasts in a coasting interval 211 in a braking delay period until the braking timing. In addition, the velocity pattern 21 shows a braking interval 212, subsequent to the coasting interval 211, in which the train 10 is controlled to brake and to decrease its velocity. On the other hand, the worst pattern 22 shows changes of velocities at various points in which the train 10 is accelerated to exceed the allowable velocity at the position $x_0$, and then the train 10 runs at velocity depending on its position in a braking delay period until the braking timing. The worst pattern 22 shows changes of velocities at various points in a powering interval 221 in which the train 10 is continuously accelerated to increase its velocity in the braking delay period, and in a coasting interval 222. Herein, the degree of deceleration in a braking interval 223 of the worst pattern 22 is similar to the degree of deceleration in the braking period 212 of the velocity pattern 21. The velocity pattern 21 differs from the worst pattern 22 as shown in FIG. 2 such that the stoppage position of the train 10 may be put off by a distance D when the train 10 runs at the limit velocity in an extension of the powering interval not allowing for stoppage of acceleration. Even in the worst pattern 22, the vehicle control device 1 is required to stop the train 10 or to decelerate its velocity to the predetermined velocity at the target position such as the running limit position.

Figure 3:
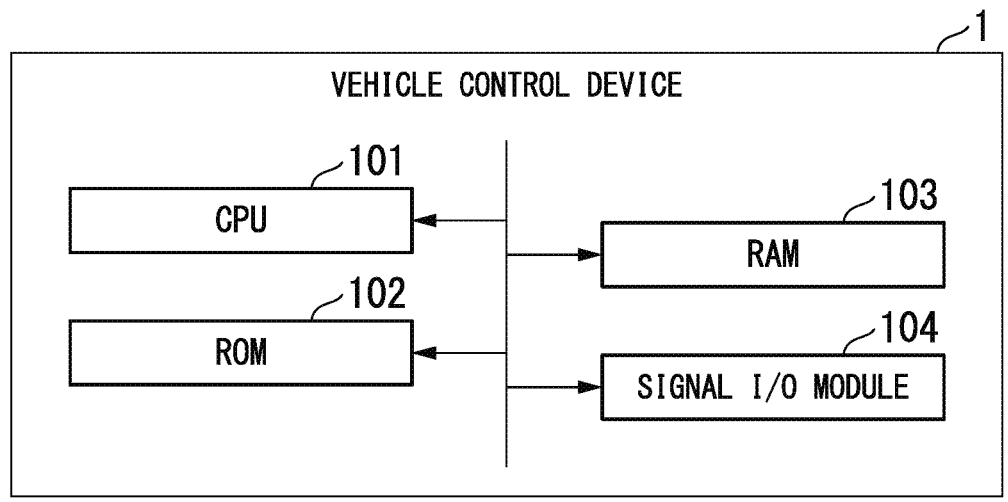
FIG. 3 is a block diagram showing the hardware configuration of the vehicle control device according to the first embodiment.

FIG. 3 is a block diagram showing the hardware configuration of the vehicle control device 1.

As shown in FIG. 3, the vehicle control device 1 is configured of a computer including a CPU (Central Processing Unit) 101, a ROM (Read-Only Memory) 102, a RAM (Random-Access Memory) 103, and a signal I/O module 104. The signal I/O module 104 receives from another device the predetermined information such as the position information used for the processing of the vehicle control device 1. The vehicle control device 1 calculates acceleration used for processing based on the received information and the altitude in accordance with the stored data of a ROM or else.

Figure 4:
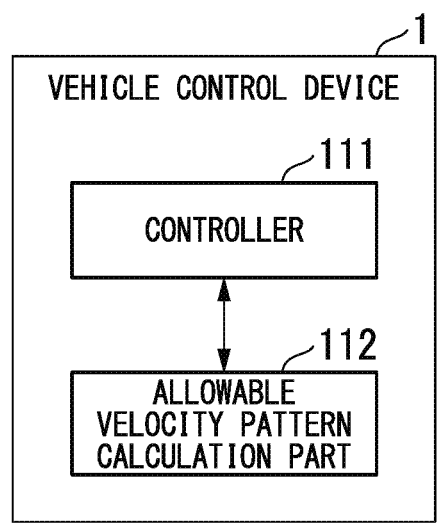
FIG. 4 is a block diagram showing the function of the vehicle control device according to the first embodiment.

FIG. 4 is a functional block diagram of the vehicle control device 1 according to the first embodiment.

In the vehicle control device 1, the CPU 101 executes programs stored therein in advance to thereby achieve the functions relating to a controller 101 and an allowable velocity pattern calculation part 112.

The controller 111 controls the processing of the vehicle control device 1.

The allowable velocity pattern calculation part 112 calculates a powering pattern representing the velocity of the train 10 at its position in the powering interval 221, a coasting pattern representing the velocity of the train 10 at its position in the coasting interval 222, and a braking pattern representing the velocity of the train 10 at its position in the braking interval 223. The allowable velocity pattern calculation part 112 uses acceleration characteristics (or torque characteristics depending on rotational speed of a motor) dependent on the velocity of the train 10 in order to calculate at least the powering pattern. In addition, the allowable velocity pattern calculation part 112 may use acceleration characteristics dependent on the velocity of the train 10 in order to calculate at least one of the coasting pattern and the braking pattern. The allowable velocity patter calculation part 112 may calculate the velocity at each position in each velocity pattern using acceleration depending on track gradients. Alternatively, the allowable velocity pattern calculation part 112 may calculate the velocity at each position in each velocity pattern sing the altitude at the current position or the target position of a vehicle instead of track gradients.

Figure 5:
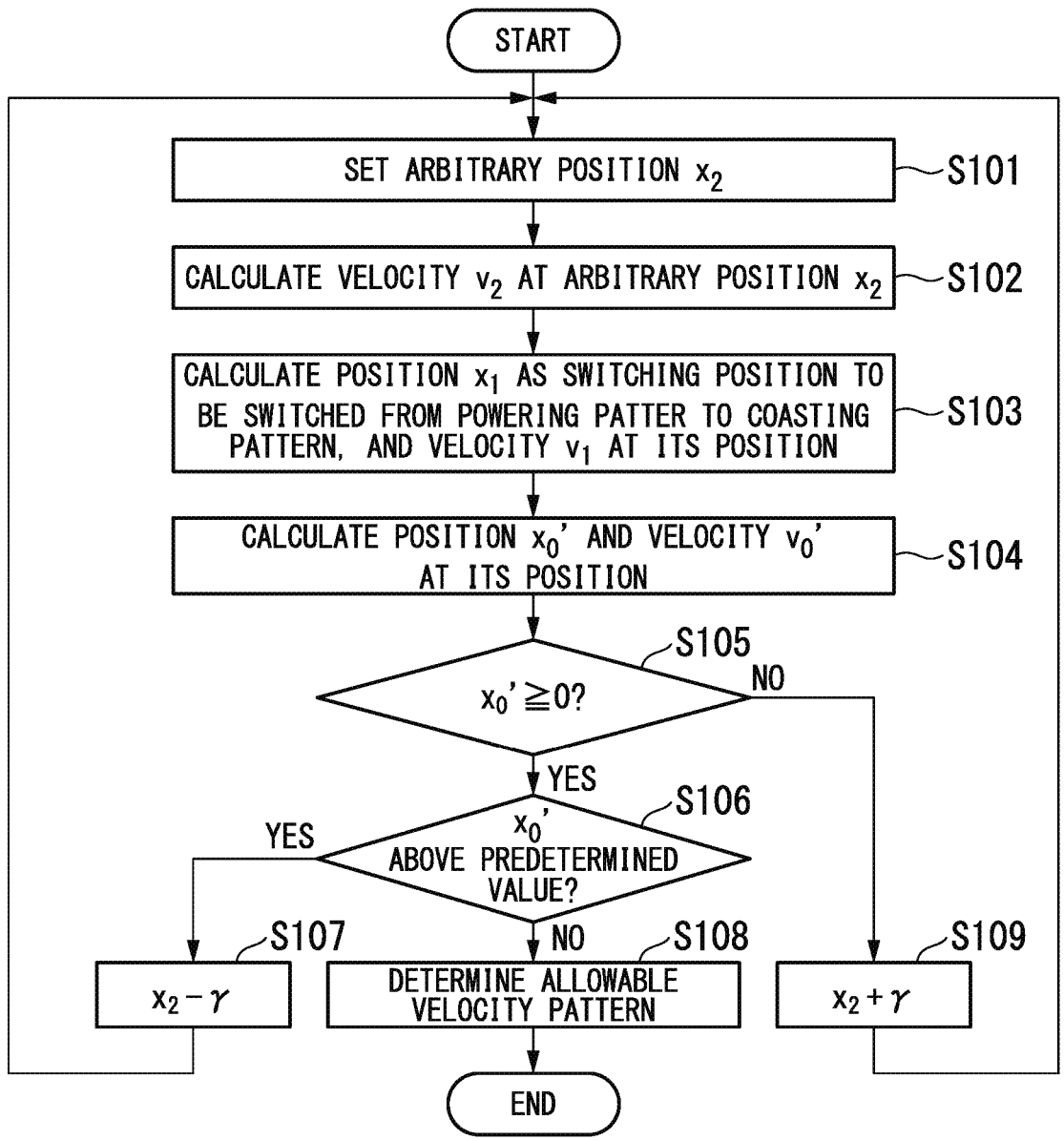
FIG. 5 is a flowchart showing the processes of the vehicle control device according to the first embodiment.

FIG. 5 is a flowchart showing the flow of processes of the vehicle control device 1 according to the first embodiment.

Figure 6:
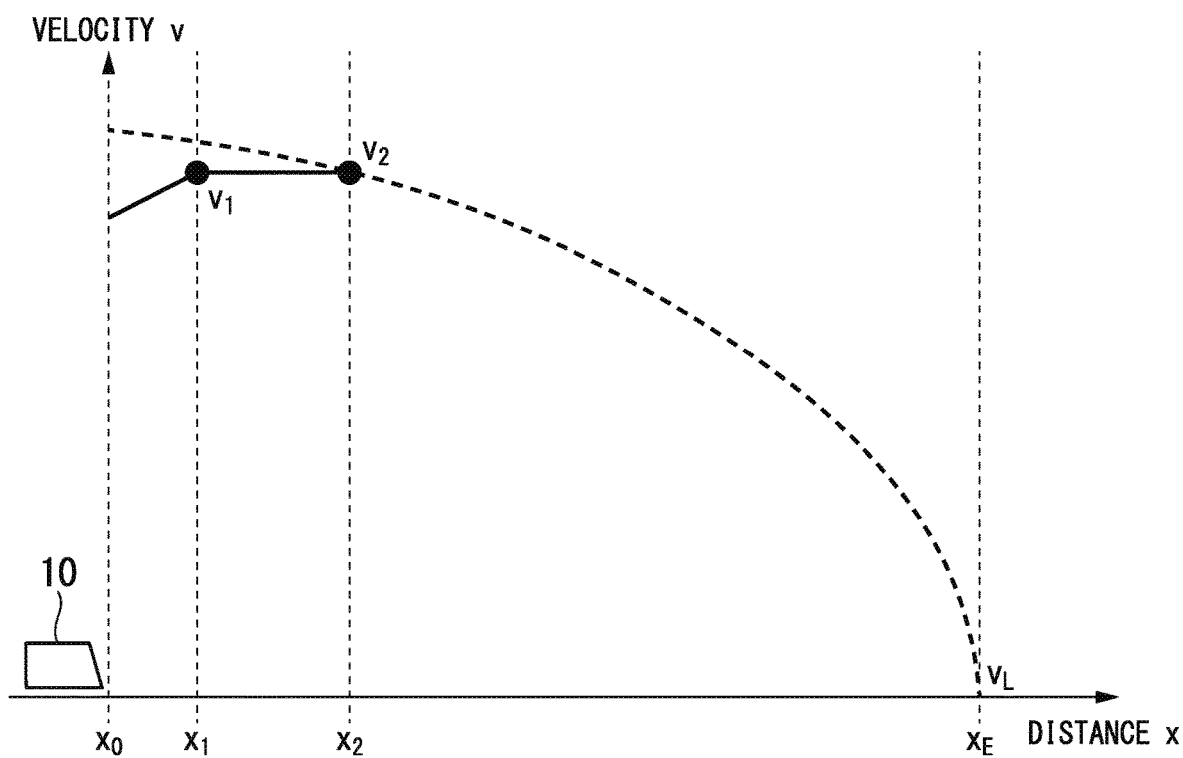
FIG. 6 is a graphic diagram showing a velocity pattern calculated by the vehicle control device according to the first embodiment.

FIG. 6 is a graphic diagram showing the velocity pattern calculated by the vehicle control device 1 according to the first embodiment.

Next, the flow of processes of the vehicle control device 1 will be described with reference to FIGS. 5 and 6.

In the following descriptions, x0 denotes the current position of the train 10. Herein, the unit of velocity is "km/h (kilo-meter per hour)", the unit of acceleration is "km/h/s", the unit of length is "m (meter)", and the unit of time is "s (second)".

The controller 111 sends to the allowable velocity pattern calculation part 112 an instruction to start calculating an allowable velocity pattern configured to control the train 10 to run at the predetermined velocity or less at the target position. In the present embodiment, the allowable velocity pattern calculation part 112 calculates the allowable velocity at a current position $x_0$ in order to control the train 10 to run at predetermined target velocity $x_L$ or less at a target position $x_E$.

At the position x0 at which the train 10 is accelerated, a powering interval may occur between the current position $x_0=0$ and a position xi; a coasting interval may occur between the position xi and a position $x_2$; and a braking interval may occur between the position $x_2$ and the position $X_E$. The running pattern of the train 10 that is controlled to brake during acceleration representing velocity patterns at various points of the train 10 consists of a powering pattern corresponding to the powering interval, a coasting pattern corresponding to the coasting interval, and a braking pattern corresponding to the braking interval.

The powering pattern is a pattern representing the velocity of the train 10 depending on its position in the powering interval in part of a braking delay period ranging from the current timing at the current position $x_0$ to the braking timing to actually start braking.

The coasting pattern is a pattern representing the velocity of the train 10 depending on its position in the coasting interval subsequent to the powering interval in another part of the braking delay period.

The braking pattern is a pattern representing the velocity of the train 10 in the braking interval ranging from the position of the train 10 at the braking timing to the target position $X_E$ at which the train 10 is controlled to run at the predetermined limit velocity or less.

It is assumed that the braking distance may become maximum due to the powering condition, the coasting condition, and the braking condition in the worst-case scenario of the standard (IEEE1474).

In the following descriptions, $x_E$ denotes the target position to control the train 10 to run at the predetermined limit velocity $v_L$; $v_L$ denotes the limit velocity at the target position $x_E$; and $x_2$ denotes the switching position at which the coasting pattern is switched to the braking pattern. In this case, Equation (1) expresses the velocity $v_2$ at the switching position $x_2$ representing the switching from the coasting pattern to the braking pattern. In Equation (1), $\beta_0$ denotes deceleration in the braking pattern. When the limit velocity $v_L>0$, it is possible to obtain a velocity-pattern equation in which the limit velocity at the target position $x_E$ is not equal to zero (stoppage) but the predetermined velocity (>0). In Equation (1), a(x) denotes an altitude at the position x, and g denotes acceleration of gravity. In Equation (1), $x_E$ denotes a distance from the position $x_0$ to the target position $x_E$.

[Equation 1]

$$v_2 = \sqrt{v_L^2 + 7.2\{\beta_0 x_E + g(a)x_E) - a(x_2))\}} \quad (1)$$

In addition, $x_1$ denotes the switching position for switching from the powering pattern to the coasting pattern, and $v_1$ denotes the velocity of the train 10 at the switching position $x_1$. In this case, the velocity $v_1$ and the position $x_1$ can be expressed by Equations (2) and (3) as follows.

[Equation 2]

$$v_1 = v_2 - \int_0^{T_c} \alpha_c(x(t'))dt' \quad (2)$$

[Equation 3]

$$x_1 = x_2 + [-v_2 T_c + \int_0^{T_c} \{\int_0^{t'} \alpha_c(x(t''))dt''\}dt']/3.6 \quad (3)$$

In Equations (2) and (3), $T_c$ denotes the maximum time of coasting a train, which is already known. In addition, x(t) denotes the position of a train preceding by time t the switching position $x_2$ for switching from the coasting pattern to the braking pattern. Moreover, k(x) denotes a gradient ratio of a track L at the position x. The gradient ratio has a positive value in the downward portion of a track. For example, k(x)=0.1 denotes a gradient ratio of a track which descends down by one meter in a distance of one-hundred meters. Acceleration $\alpha_c(x)$ at the position x can be expressed as "$\alpha_c(x) = k(x)g + \alpha_s$". Herein, $\alpha_s$ denotes acceleration due to a factor for increasing the braking distance such as tailwind.

It is possible to express a position $x_0'$ for starting the powering pattern and velocity $v_0'$ of the train 10 at the position $x_0'$ by Equations (4) and (5) as follows.

[Equation 4]

$$v_0' = v_1 - \int_0^{T_r} \alpha_r(x(t'), v(t'))dt' \quad (4)$$

[Equation 5]

$$x_0' = x_1 + [-v_1 T_r + \int_0^{T_r}\{\int_0^{t'} \alpha_r(x(t''), v(t''))dt''\}dt']/3.6 \quad (5)$$

In this connection, $\alpha_m(v)$ denotes the acceleration of the train 10 at a torque produced by a motor dependent on rotational speed corresponding to the velocity v, wherein acceleration $\alpha_r(x, v)$ representing the acceleration of the train 10 at the position x and at the velocity v can be expressed as "$\alpha_r(x,v) = \alpha m(v) + k(x)$". To realize at the switching position between the powering pattern and the coasting pattern after accelerating the train 10 for time $T_r$, it is necessary to reach $v_0'$ and $x_0'$ at the position $x_0$. In Equations (4) and (5), x(t) and v(t) denote the position and the velocity of the train 10 at the timing preceding by time t the switching position xi between the powering pattern and the coasting pattern.

The allowable velocity pattern calculation part 112 sets an arbitrary position $x_2$ (step S101). Subsequently, velocity $v_2$ at the arbitrary position $x_2$ is calculated by Equation (1) (step S102). Using the velocity $v_2$, the position $x_2$, Equations (2) and (3), the allowable velocity pattern calculation part 112 calculates the switching position $x_1$ between the powering patter and the coasting pattern and the velocity $v_1$ at the position $x_1$ (step S103).

Using the position $x_1$ and the velocity $v_1$, the allowable velocity pattern calculation part 112 calculates the position $x_0'$ and the velocity $v_0'$ by Equations (4) and (5) (step S104).

Upon arbitrarily setting the position $x_2$, the allowable velocity pattern calculation part 112 calculates the position $x_0'$ relative to the position $x_0$ and then determines whether $x_0'$ is equal to zero or more (step S105). The allowable velocity pattern calculation part 112 determines whether $x_0'$ is equal to a predetermined value or more (step S106), wherein when $x_0'$ is equal to a predetermined value or more, it is possible to repeat the foregoing steps following step S102 by subtracting a predetermined value $\chi$ from the arbitrarily-set value of the position $x_2$ (step S107). It is possible to set the position $x_2$ to approach the position $x_0$ by subtracting a predetermined value $\chi$ from the arbitrarily-set value of the position $x_2$. The condition in which $x_0'$ calculated relatively to $x_0$ is equal to zero or more while the decision of step S106 is "NO" indicates the condition in which the allowable velocity pattern calculation part 112 calculates the position $x_0'$ of the train 10 to be identical to the position $x_0$ or to be close to the position $x_1$, and therefore it is possible to determine an allowable velocity pattern using various values calculated by Equations (1) through (5) (step S108). The allowable velocity pattern may be expressed as the information represented by the foregoing equations for the powering pattern, the coasting pattern, and the braking pattern as well as the position $x_0'$ and the velocity $v_0'$ at the position $x_0'$, the position $x_1$ and the velocity $v_1$ at the position $x_1$, the position $x_2$ and the velocity $v_2$ at the position $x_2$, the position $x_E$ and the velocity $v_L$ at the position $x_E$. The controller 111 outputs a braking instruction upon determining that the velocity of the train 10 exceeds the foregoing velocities at various points based on the allowable velocity pattern.

When the value of the position $x_0'$ calculated relatively to the position $x_0$ is less than zero, the allowable velocity pattern calculation part 112 may calculate the position $x_0'$ as a previously-running position preceding to the position $x_0$, at which the train 10 run in the past. Hence, it is impossible to calculate an allowable velocity pattern subsequent to the position $x_0$ using the values calculated by Equations (1) through (5). For this reason, the present embodiment is designed to repeat the foregoing steps by adding the predetermined value $\chi$ to the arbitrarily-set value of the position $x_2$ (step S109), and therefore it is possible for the allowable velocity pattern calculation part 112 to calculate an allowable velocity pattern using the values calculated by Equations (1) through (5) at the arbitrary position $x_2$ where the value of the position $x_0'$ relative to the position $x_0$ becomes equal to zero or more. By adding the predetermined value $\chi$ to the arbitrarily-set value of the position $x_2$, it is possible to set the position $x_2$ to leave from the position $x_0$. In this connection, it is possible to set an optimum value as the position $x_2$ when the value of the position $x_0'$ relative to the position $x_0$. Even when the value of the position $x_0'$ calculated relatively to the position $x_0$ becomes more than zero, it is possible to calculate an allowable velocity pattern in which the train 10 can be stopped at the target position $x_E$ or the train 10 can be decelerated to the limit velocity or less at the target position $x_E$; hence, no problem may occur in safety.

The foregoing processes of the allowable velocity pattern calculation part 112 may determine equations of acceleration depending on the velocity of the train 10 in consideration of torque characteristics dependent on rotational speed of a motor (train velocity) in the powering pattern alone. Alternatively, it is possible to determine equations of acceleration depending on the velocity of the train 10 in the braking pattern and the coasting pattern as well.

The following descriptions refer to calculations using torque characteristics dependent on rotational speed of a motor in the braking pattern. Using deceleration $\beta_m(v)$ of the train 10 corresponding to the decelerating torque which can be produced by a motor, it is possible to express deceleration $\beta_b$ at (position, velocity)=(x,v) as "$\beta_b(x,v)=\beta_m(v)-k(x)g-\alpha s$". At this time, it is possible to express the velocity v2 at the braking-pattern starting position x2 and the position x2 by Equations (6) and (7) as follows.

[Equation 6]

$$v_2 = v_L + \int_0^t \beta_b(x(t'), v(t')) dt' \qquad (6)$$

[Equation 7]

$$x_2 = x_E + [-v_L t - \int_0^t \{\int_0^{t'} \beta_b(x(t''), v(t'')) dt''\} dt']/3.6 \qquad (7)$$

Equations (6) and (7) represent the braking pattern using a parameter as the time t at which the train 10 reaches the position $x_E$. Upon assuming the time t, it is possible to set the switching position $x_2$ between the coasting pattern and the braking pattern using Equations (6) and (7) by assuming that the position $x_2$ of the train 10 at the time t would be equivalent to the switching position between the coasting pattern and the braking pattern.

The following descriptions refer to calculations using torque characteristics dependent on rotational speed of a motor in the coasting pattern. Using deceleration $\beta_n(v)$ of the train 10 corresponding to the decelerating torque of a motor, it is possible to express the acceleration at (position, velocity)=(x,v) as "$\alpha_c(x,v)=k(x)g+\alpha_s-\beta_n(v)$". At this time, it is possible to calculate the coasting pattern by Equations (8) and (9) as follows.

[Equation 8]

$$v_1 = v_2 - \int_0^{T_c} \alpha_c(x(t'), v(t')) dt' \qquad (8)$$

[Equation 9]

$$x_1 = x_2 + [-v_2 T_c + \int_0^{T_c} \{\int_0^{t'} \alpha_c(x(t''), v(t'')) dt''\} dt']/3.6 \qquad (9)$$

According to the processes of the allowable velocity pattern calculation part 112, it is possible to prevent the over-evaluation of a braking distance and the under-estimation of allowable velocity by use of motor characteristics for reducing torque (corresponding to acceleration of a vehicle) at a higher rotational speed of a motor (corresponding to high speed of the train 10).

According to the above processes, the vehicle control device 1 calculates the powering pattern, the coasting pattern, and the braking pattern using a torque depending on rotational speed (train speed) and acceleration caused by the torque, and therefore it calculates the allowable velocity of the train 10 at each point. Accordingly, it is possible to control the train 10 according to the allowable velocity pattern using motor characteristics for reducing a torque (or acceleration of a vehicle) produced by the train 10 at a high-velocity condition due to a high rotational speed of a motor. Under the above control, it is possible to prevent the vehicle control device 1 from controlling the train 10 upon underestimating the allowable velocity.

Second Embodiment

Figure 7:
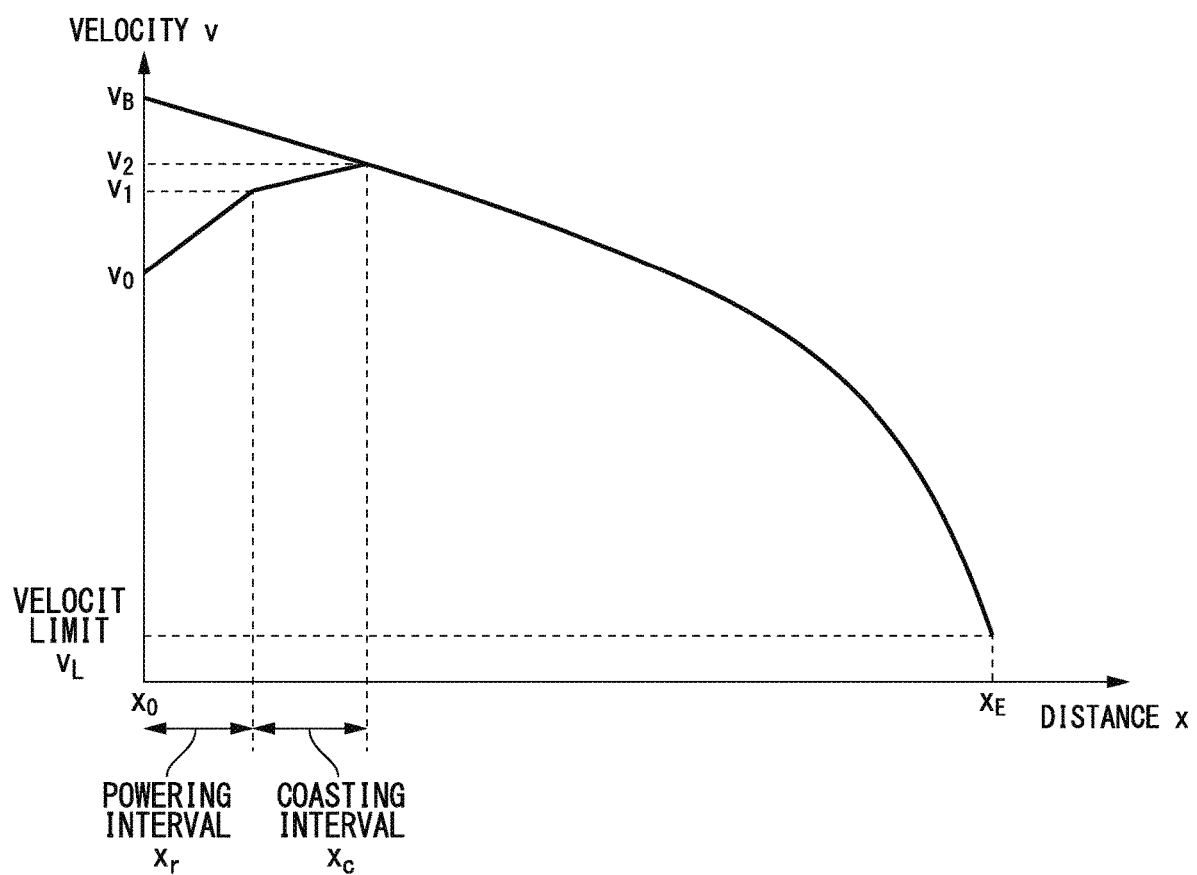
FIG. 7 is a graphic diagram showing a velocity pattern calculated by the second embodiment.

FIG. 7 is a graphic diagram showing an allowable velocity pattern calculated by a vehicle control device according to the second embodiment.

In the first embodiment, the vehicle control device 1 changes the value of the position $x_2$ upon determining whether the value of the position $x_0'$ calculated by Equation (5) becomes equal to zero or more, and therefore it calculates the position $x_2$ corresponding to the value of the position $x_0'$ equal to zero or more, and the position $x_1$. According to the above calculations, however, the allowable velocity pattern calculation part 112 needs to carry out iterative calculations, and therefore it may take a long time to calculate the allowable velocity pattern up to the target position $x_E$ based on the position $x_0$. For this reason, the second embodiment refers to the method as to how the allowable velocity pattern calculation part 112 can calculate an allowable velocity pattern in a short time.

In the second embodiment, the allowable velocity pattern calculation part 112 calculates the velocity limit with respect to the powering interval and the coasting interval and thereby calculates the length of each interval based on the velocity limit. In this connection, it is possible to calculate the length of each interval using the velocity limit since prescribed values can be used to represent the powering interval, which may occur due to a shutdown delay of powering the train 10, and the coasting interval which occurs due to a braking delay. In the second embodiment, the allowable velocity pattern calculation part 112 is configured to calculate an allowable velocity pattern by equations using altitude differences rather than track gradients. In the following descriptions, the unit of velocity is [km/h]; the unit of acceleration is [km/h/s]; the unit of length is [m]; and the unit of time is [s].

Specifically, the allowable velocity pattern calculation part 112 calculates assumed upper-limit velocity $v_B$ at the current position $x_0$ preceding to the position $x_2$ at the braking timing in the braking pattern by Equation (10) In Equation (10), $\beta_0$ denotes deceleration; a(x) denotes an altitude at the position x; and g denotes the acceleration of gravity.

[Equation 10]

$$v_B = \sqrt{v_L^2 + 7.2\{\beta_0 x_E + g(a(x_E) - a(0))\}} \quad (10)$$

The allowable velocity pattern calculation part 112 sets the velocity limit for the powering pattern and the coasting pattern to the upper-limit velocity $v_B$ calculated by Equation (10), and then it calculates an upper-limit value $x_r$ of the powering-internal length and an upper-limit value $x_c$ of the coasting-interval length. In this connection, the upper-limit value $x_c$ of the coasting-interval length can be expressed as "$x_c = v_B \times T_c \div 3.6$". Herein, $T_c$ denotes a coasting time. The upper-limit value $x_r$ of the powering-interval length can be expressed as "$x_r = v_B \times T_r \div 3.6$". Herein, $T_r$ denotes a powering time. The coasting time $T_c$ and the powering time $T_r$ are prescribed values.

The allowable velocity pattern calculation pattern 112 calculates the velocity $v_2$ at which the coasting interval is terminated and shifted to the braking interval by Equation (11).

[Equation 11]

$$v_2 = \sqrt{v_B^2 - 7.2\{\beta_0(x_r + x_c) + g(a(x_r + x_c) - a(0))\}} \quad (11)$$

Next, the allowable velocity pattern calculation part 112 calculates the velocity $v_1$ at which the powering interval is terminated and shifted to the coasting interval by Equation (12). In Equation (12), $\beta_w$ denotes acceleration due to an influence of wind.

[Equation 12]

$$v_1 = \sqrt{v_2^2 - 7.2\{\beta_w x_c - g(a(x_r + x_c) - a(x_r))\}} \quad (12)$$

Subsequently, the allowable velocity pattern calculation part 112 calculates the velocity $v_0$ at the current position $x_0$ of the train 10 by Equation (13).

[Equation 13]

$$v_0 = \sqrt{v_1^2 - 7.2\{(\alpha_r(v_1 - \alpha_{max} T_r) + \beta_w)x_r - g(a(x_r) - a(0))\}} \quad (13)$$

In Equation (13), $\alpha_r(v)$ denote the maximum acceleration which occurs at the velocity v according to motor characteristics. In Equation (13), $\alpha_{max}$ denotes the maximum acceleration which may occur along a track under an influence of track gradients. In Equation (13), "$v_1 - \alpha_{max} \cdot T_r$" represents the minimum velocity which may occur when the time $T_r$ elapses from the timing of the velocity $v_1$, while "$\alpha_r(v_1 - \alpha_{max} \cdot T_r)$" represents the maximum acceleration which can be produced by a motor of the train 10 in the powering time $T_r$ subsequent to the timing of the velocity $v_1$. Herein, an acceleration may not be increased even when a velocity is increased due to motor characteristics.

According to the above processes, the present embodiment is designed to calculate the assumed upper-limit velocity $v_B$ and to thereby calculate the velocity $v_0$ at the current position $x_0$ of the train 10 using the upper-limit value $x_r$ of the powering-interval length and the upper-limit value $x_c$ of the coasting-interval length based on the upper-limit velocity $v_B$. Accordingly, it is possible to calculate an allowable velocity pattern in a short time without carrying out iterative calculations.

Third Embodiment

Both the first and second embodiments do not necessarily consider the weight of a vehicle when calculating acceleration which can be produced by a motor of the train 10. The third embodiment differs from other embodiments in that it uses deceleration considering the weight of the train 10.

Upon determining velocity, it is possible to univocally determine tractive force which can be produced by a motor of the train 10. On the other hand, acceleration may depend on the weight of the train 10 as well. Assuming an empty condition of a vehicle, it is possible to produce a larger value of acceleration and to thereby calculate an allowable velocity pattern based on the acceleration, however, the allowable velocity pattern may cause an excessive reduction of the allowable velocity by an increase of acceleration. For this reason, the controller 111 of the vehicle control device 1 is configured to detect tractive force F generated by a motor. In addition, the controller 111 measures acceleration α which actually occurs in the train 10. The controller 111 estimates a train weight $m_e$ by an equation of "$m_e = F \div \alpha$". Using the estimated train weight $m_e$, the controller 111 calculates the maximum acceleration $\alpha_{max}$ produced by a motor by an equation of "$\alpha_{max} = F_{max} \div m_e$". Herein, $F_{max}$ denotes the maximum tractive force produced by a motor of the train 10. The allowable velocity pattern calculation part 112 calculates the braking pattern, the coasting pattern, and the powering pattern using the maximum acceleration $\alpha_{max}$, which is calculated by the controller 111 according to the processes of the first and second embodiments.

According to the third embodiment, it is possible to prevent an excessive reduction of the allowable velocity.

The foregoing embodiments refer to trains as an example of vehicles, wherein trains may include a vehicle to be controlled by ATC (Automatic Train Control). In addition, the above technology may be applied to other types of vehicles such as automobiles except for trains.

The vehicle control device 1 includes a computer system. Programs causing the vehicle control device 1 to carry out the foregoing processes are stored on computer-readable storage media installed in the vehicle control device 1. That is, it is possible to carry out the foregoing processes by the vehicle control device 1 with a computer configured to read and execute those programs. Herein, the term "computer-readable storage media" may refer to magnetic disks, magneto-optic disks, CD-ROM, DVD-ROM, and semiconductor memory. In addition, it is possible to deliver computer programs to a computer through communication lines, whereby the computer may receive and execute computer programs.

The foregoing programs may achieve part of the foregoing functions of the processing parts. In addition, the foregoing programs may be differential files (or differential programs) which can be combined with pre-installed programs of a computer system to achieve the foregoing functions.

INDUSTRIAL APPLICABILITY

The present invention relates to a vehicle control device, a vehicle control method, and a program, which can accurately calculate allowable velocities and which can control vehicles to reliably stop in running-permitted intervals of distance according to the worst-case scenario of IEEE1474.

REFERENCE SIGNS LIST

1 . . . vehicle control device
10 . . . train
100 . . . vehicle control system
101 . . . CPU
102 . . . ROM
103 . . . RAM:
104 . . . signal I/O module
111 . . . controller
112 . . . allowable velocity pattern calculation part
21 . . . velocity pattern f a train not implementing powered running
211 . . . coasting interval
212 . . . braking interval
22 . . . worst pattern
221 . . . powering interval
222 . . . coasting interval
223 . . . braking interval
L . . . track

The invention claimed is:

1. A vehicle control device configured to perform velocity control such that a vehicle traveling on a track is braked and decelerated to a predetermined velocity at a target position, comprising:
an allowable velocity pattern calculation part configured to calculate an allowable velocity pattern upon obtaining position information of the vehicle when a powering interval, a coasting interval, and a braking interval occur due to a braking delay between a timing at which the vehicle exceeds allowable velocity and a braking timing at which the vehicle starts to brake, based on velocity of the vehicle at a powering-start position of the powering interval, first velocity of the vehicle at a first switching position between the powering interval and the coasting interval, and second velocity of the vehicle at a second switching position between the coasting interval and the braking interval,
wherein the allowable velocity pattern calculation part is configured to adjust the second switching position such that the powering-start position falls within a determined value, and to calculate the second velocity at an adjusted second switching position using the predetermined velocity at the target position, to calculate the first velocity at the first switching position using the second velocity at the adjusted second switching position, and to calculate the velocity of the vehicle at the powering-start position using the first velocity, and
wherein the allowable velocity pattern calculation part uses an acceleration characteristic depending on the velocity of the vehicle when calculating the velocity at the powering-start position.

2. The vehicle control device according to claim 1, wherein, the allowable velocity pattern calculation part is configured to calculate the first velocity at the first switching position between the powering interval and the coasting interval based on first acceleration of the vehicle corresponding to a prescribed velocity of the vehicle running in the powering interval and to calculate the second velocity at the second switching position between the coasting interval and the braking interval based on second acceleration of the vehicle corresponding to a prescribed velocity of the vehicle running in the coasting interval.

3. The vehicle control device according to claim 1, wherein the allowable velocity pattern calculation part is configured to calculate an assumed limit velocity of the vehicle at its current position based on the predetermined velocity at the target position, deceleration at the target position, and an altitude difference between the target position and the current position of the vehicle, thus calculating the first velocity at the first switching position and the second velocity at the second switching position using the assumed limit velocity.

4. The vehicle control device according to claim 1, wherein the allowable velocity pattern calculation part is configured to calculate the allowable velocity pattern based on the altitude difference between the target position and the current position of the vehicle.

5. The vehicle control device according to claim 1, wherein the allowable velocity pattern calculation part uses the acceleration characteristic depending on a weight of the vehicle.

6. A vehicle control method configured to perform velocity control such that a vehicle traveling on a track is braked and decelerated to a predetermined velocity at a target position, comprising:
calculating an allowable velocity pattern upon obtaining position information of the vehicle when a powering interval, a coasting interval, and a braking interval occur due to a braking delay between a timing at which the vehicle exceeds allowable velocity and a braking timing at which the vehicle starts to brake, based on velocity of the vehicle at a powering-start position of the powering interval, first velocity of the vehicle at a first switching position between the powering interval and the coasting interval, and second velocity of the vehicle at a second switching position between the coasting interval and the braking interval;
adjusting the second switching position such that the powering-start position falls within a determined value; and
calculating the second velocity at an adjusted second switching position using the predetermined velocity at the target position, the first velocity at the first switching position using the second velocity at the adjusted second switching position, and the velocity of the vehicle at the powering-start position using the first velocity,
wherein an acceleration characteristic depending on the velocity of the vehicle is used to calculate the velocity at the powering-start position.

7. A computer-readable storage medium having a program causing a computer of a vehicle control device configured to perform velocity control such that a vehicle traveling on a track is braked and decelerated to a predetermined velocity at a target position, thus implementing:
calculating an allowable velocity pattern upon obtaining position information of the vehicle when a powering interval, a coasting interval, and a braking interval occur due to a braking delay between a timing at which the vehicle exceeds allowable velocity and a braking timing at which the vehicle starts to brake, based on velocity of the vehicle at a powering- start position of the powering interval, first velocity of the vehicle at a first switching position between the powering interval and the coasting interval, and second velocity of the vehicle at a second switching position between the coasting interval and the braking interval;

adjusting the second switching position such that the powering-start position falls within a determined value; and calculating the second velocity at an adjusted second switching position using the predetermined velocity at the target position, the first velocity at the first switching position using the second velocity at the adjusted second switching position, and the velocity of the vehicle at the powering-start position using the first velocity, wherein an acceleration characteristic depending on the velocity of the vehicle is used to calculate the velocity at the powering-start position.

8. The vehicle control device according to claim 1, wherein at least the velocity in the powering interval is calculated according to acceleration characteristics of each motor included in the vehicle depending on the velocity of the vehicle in which a torque is maintained or reduced as a rotational speed of each motor becomes higher.

9. The vehicle control method according to claim 6, wherein at least the velocity in the powering interval is calculated according to acceleration characteristics of each motor included in the vehicle depending on the velocity of the vehicle in which a torque is maintained or reduced as a rotational speed of each motor becomes higher.

10. The computer-readable storage medium having a program according to claim 7, wherein at least the velocity in the powering interval is calculated according to acceleration characteristics of each motor included in the vehicle depending on the velocity of the vehicle in which a torque is maintained or reduced as a rotational speed of each motor becomes higher.

* * * * *